(12) United States Patent
Potter et al.

(10) Patent No.: US 6,714,045 B2
(45) Date of Patent: Mar. 30, 2004

(54) STATIC TRANSMISSION OF FAST14 LOGIC 1-OF-N SIGNALS

(75) Inventors: Terence M. Potter, Austin, TX (US); James S. Blomgren, Austin, TX (US); Laura A. Potter, Austin, TX (US); Fritz A. Boehm, Dripping Springs, TX (US)

(73) Assignee: Intrinsity, Inc., Austin, TX (US)

( * ) Notice: Subject to any disclaimer, the term of this patent is extended or adjusted under 35 U.S.C. 154(b) by 0 days.

(21) Appl. No.: 10/186,770

(22) Filed: Jul. 1, 2002

(65) Prior Publication Data

US 2003/0042935 A1 Mar. 6, 2003

Related U.S. Application Data

(60) Provisional application No. 60/302,400, filed on Jul. 2, 2001.

(51) Int. Cl.$^7$ .......................... H03K 19/00; G01R 31/28
(52) U.S. Cl. ..................... 326/59; 326/16; 326/93; 326/105; 326/98; 714/724; 714/725
(58) Field of Search ................ 326/59, 16, 93, 326/95, 98, 104, 108; 714/724, 725

(56) References Cited

U.S. PATENT DOCUMENTS

| | | | |
|---|---|---|---|
| 6,069,497 A | * | 5/2000 | Blomgren et al. .......... 326/105 |
| 6,124,735 A | * | 9/2000 | Blomgren et al. ............ 326/98 |
| 6,233,707 B1 | * | 5/2001 | Potter et al. ................ 714/724 |
| 6,271,683 B1 | * | 8/2001 | Horne et al. .................. 326/93 |

OTHER PUBLICATIONS

Kukimoto, Yuji and Jang, Jae–Young, "VIS CTL Syntax" Manual dated Feb. 27, 1997, The VIS Group, Univ. of CA.

* cited by examiner

Primary Examiner—Vibol Tan
(74) Attorney, Agent, or Firm—Booth Wright LLP; Matthew J. Booth; Karen S. Wright

(57) ABSTRACT

A static output signal is generated using a static storage element (104) and transmitted to a NDL gate (110) over a transmission path (112) that is characterized by a user-specified multi-cycle timing constraint that is used to create appropriate verification tests of the apparatus. The multi-cycle timing constraint may be a pragma that is interpreted by the compiler of a timing analysis tool such as PATHMILL to automatically check the set-up and hold times of the static signal relative to the rising edge or falling edge of user-specified clock signal pulses. The same pragma is interpreted by the compiler of a functional verification tools such as VIS to create statements that test the behavior of the apparatus during the clock signal pulses other than the user-specified clock signal pulses tested by the timing analysis tool.

12 Claims, 4 Drawing Sheets

STATIC TRANSMISSION OF FAST14 LOGIC 1-OF-N SIGNALS

CROSS REFERENCE TO RELATED APPLICATIONS

This application claims the benefits of the earlier filed U.S. Provisional Application Ser. No. 60/302,400, filed Jul. 2, 2001 (Jul. 2, 2001), which is incorporated by reference for all purposes into this specification.

BACKGROUND OF THE INVENTION

1. Field of the Invention

The present invention relates to power management in dynamic logic. More specifically, the present invention relates to the use of static signals within a dynamic logic design to transmit data across a distance to reduce the overall power consumption of the logic design.

2. Description of the Related Art

High performance complementary metal-oxide semiconductor (CMOS) very large scale integrated (VLSI) circuits are increasingly using dynamic logic gates to improve circuit performance. Dynamic logic gates are fast but require a frequent refresh to hold a logic state. Constantly switching transistors on and off to precharge and then evaluate dynamic logic gates consumes an enormous amount of power. Accordingly, because of the power and noise constraints on dynamic logic gates, many high-performance CMOS VLSI are designed using conventional static logic gates outside the critical path of the logic. Static circuits hold state without a frequent refresh. Since power is consumed only when the inputs switch, static circuits consume much less power than dynamic circuits.

However, static circuits are generally slower than dynamic circuits, and mixing the two has been problematic. Static flip-flops have been used to interface dynamic logic and static logic, but this typically creates timing and performance problems due to the long setup and hold times associated with static flip-flops.

Static signals which feed dynamic gates must be stable by the time the dynamic gate goes into its evaluate state for every cycle, since dynamic gates require monotonic inputs. Once an N-tree has been discharged, it cannot be pulled high again until the next pre-charge phase. This means that a static input signal to a dynamic gate cannot transition from high-to-low during the evaluate phase of the gate if the static input signal's high value has been allowed to start switching the gate. Designers have thus typically imposed long setup time requirements on static signals that are inputs to dynamic logic to insure that a static input signal has arrived and is stable and not oscillating before the gate evaluates. In the past, designers have accommodated the setup requirement by simply operating the design at a slower clock rate, thus giving the static flip-flop adequate time to provide stable output signals to the dynamic logic gate before the dynamic logic gate enters the evaluation period. Alternatively, some designers have inserted a clock delay between a static flip-flop and the dynamic gate the flip-flop is driving, to delay the gate's evaluation phase enough to insure that the flip-flop's outputs are stable. Neither solution is practical for today's high performance circuits. The timing constraints that typical static flip-flops impose on designers trying to use them in dynamic logic is described in detail in the U.S. Pat. No. 6,118,304 (hereinafter, the "Logic Synchronization Patent"), which is incorporated by reference for all purposes into this specification.

The Logic Synchronization Patent, and the documents referenced therein (specifically, U.S. patent application Ser. No. 09/019,355, now U.S. Pat. No. 6,066,965, entitled "Method and Apparatus for a Logic Circuit using 1 of 4 Signals" (hereinafter, "the NDL patent")) also describe the use of NDL or N-NARY dynamic logic and a novel multiphase clock scheme for logic timing and synchronization that makes extensive use of 'time-borrowing' to achieve the extremely fast logic required for current high-performance applications. N-NARY logic, also known as FAST14 logic, is a new logic family developed by Intrinsity Inc. (f/k/a EVSX Inc.), the Assignee of this application. Although, as the NDL patent details, the FAST14 logic technology includes features that cause circuits implemented in FAST14 logic (denoted as "NDL gates" or "NDL designs") to consume much less power than traditional dual-rail dynamic logic, even highly complex NDL designs can suffer some of the power problems associated with the high switch factor of traditional dynamic logic. Consequently, designers of NDL circuits and systems may find it advantageous to utilize design approaches and methods typically found in static logic to reduce the system's power consumption. For example, U.S. patent application Ser. No. 10/187,879, filed on Jul. 2, 2002, and entitled "Static Storage Element for Dynamic Logic" (hereinafter, "the Static Storage Element Patent") describes two different embodiments of a static storage element suitable for use in NDL designs. As described in the Static Storage Element patent, these storage devices statically store the output of dynamic logic gates for a user-specified number of clock cycles, and then provide the output to downstream dynamic logic gates. Designers using FAST14 technology can use the static storage devices in lieu of dynamic buffers, thereby eliminating the power consumed by the buffers' constantly switching transistors. The NDL Patent and the Static Storage Element patent are incorporated by reference for all purposes into this specification. Additionally, FAST14 logic and some common structures, features, and functions of FAST14 logic are further described in U.S. Pat. No. 6,069,497, (FAST14 Circuit Using 1 of N Signals), U.S. Pat. No. 6,219,686 (Sum/HPG Adder/Subtractor Gate), U.S. Pat. No. 6,202,194 (Twizzle), U.S. Pat. No. 6,324,239 (Shifter), and U.S. Pat. No. 6,269,387 (3-Stage 32-Bit Adder), all of which are incorporated by reference for all purposes into this specification.

As described in the NDL patent and the Logic Synchronization Patent, the various speed advantages that the FAST14 dynamic logic design style provides are generally associated with the performance of logic gates. There is no inherent speed advantage in NDL designs that relates to data transmission, which, like traditional dynamic logic, is dominated by an RC delay. However, transmitting data using dynamic signals in dynamic logic designs does consume more power than transmitting data in a static design, again because of the higher transistor switch factor required to move dynamic signals. Also, there is a routing burden for complimentary dynamic logic, as at least two wires are needed to transmit a single bit of data.

The present invention provides an apparatus and method that FAST14 designers can utilize in connection with the static storage elements disclosed in the Static Storage Element Patent to reduce the power consumption associated with data transmission in NDL designs.

SUMMARY OF THE INVENTION

The present invention is a method and apparatus for the static transmission of FAST14 logic's 1-of-N signals. A static output signal is generated using a static storage element and transmitted to a NDL gate over a transmission path that is characterized by a user-specified multi-cycle timing constraint that is interpreted by the compiler of one or more development tools to create appropriate verification tests of the apparatus. The multi-cycle timing constraint may be a pragma that is interpreted by the compiler of a timing analysis tool such as PATHMILL to create statements that check the set-up and hold times of the static signal relative to the rising edge or falling edge of user-specified clock signal pulses. The same pragma is interpreted by the compiler of a functional verification tool such as VIS to create statements that test the behavior of the apparatus during the clock signal pulses other than the user-specified clock signal pulses tested by the timing analysis tool.

As a result of the setup and hold times associated with static signals that are inputs to dynamic gates, the static output signal may be required to hold its value for at least two successive clock cycles. To achieve higher data throughput, the present invention may include a dynamic mux that, during each clock cycle, selects either the static output signal or a second static output signal that also holds its value for at least two successive clock cycles. If the first and second static output signals are allowed to switch values on alternate clock pulses, the dynamic mux can provide new data to the NDL gate during each clock cycle.

DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus for statically transmitting data in a logic design implemented in FAST14 technology. This disclosure describes numerous specific details that include specific encodings, structures, circuits, and logic functions in order to provide a thorough understanding of the present invention. For example, the present invention describes circuits using NDL read gates and dynamic muxes. Those skilled in the art will understand that the practice of the present invention includes logic functions other than the previously described ones including basic logic elements, adders, shifters, and multiplexers. One skilled in the art will appreciate that one may practice the present invention without these specific details.

Additionally, this disclosure does not describe some well known structures such as transistors, FETs, domino circuits, FAST14 logic, and basic NDL circuits in detail in order not to obscure the present invention. Finally, those skilled in the art will understand that the descriptors "N-NARY", "FAST14" and "NDL" are trademarks owned by Intrinsity Inc. (f/k/a EVSX Inc.) that describe and relate to a new dynamic logic family developed by Intrinsity, which is the Assignee of this application. "N-NARY logic" and "FAST14 logic" mean the same thing and are used interchangeably throughout this specification. "NDL circuits" and "NDL gates" are 1-of-N dynamic logic circuits implemented in the FAST14 logic technology. A "1-of-N signal" refers to the multi-wire 1-hot signal used in FAST14 technology that has the specific physical and functional characteristics further described in the NDL Patent and the other patents referenced above.

Figure 1:
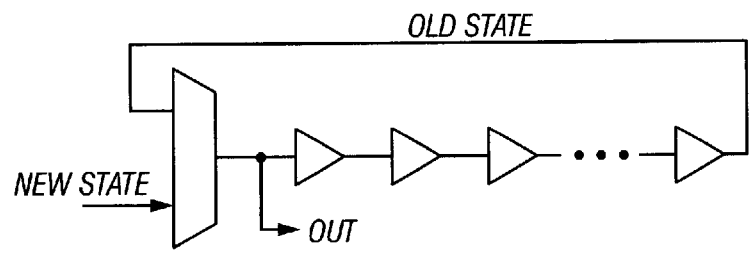
FIG. 1 shows a series of dynamic storage elements (a buffer loop) typically used to dynamically transmit data in a dynamic logic design.
Figure 2A:
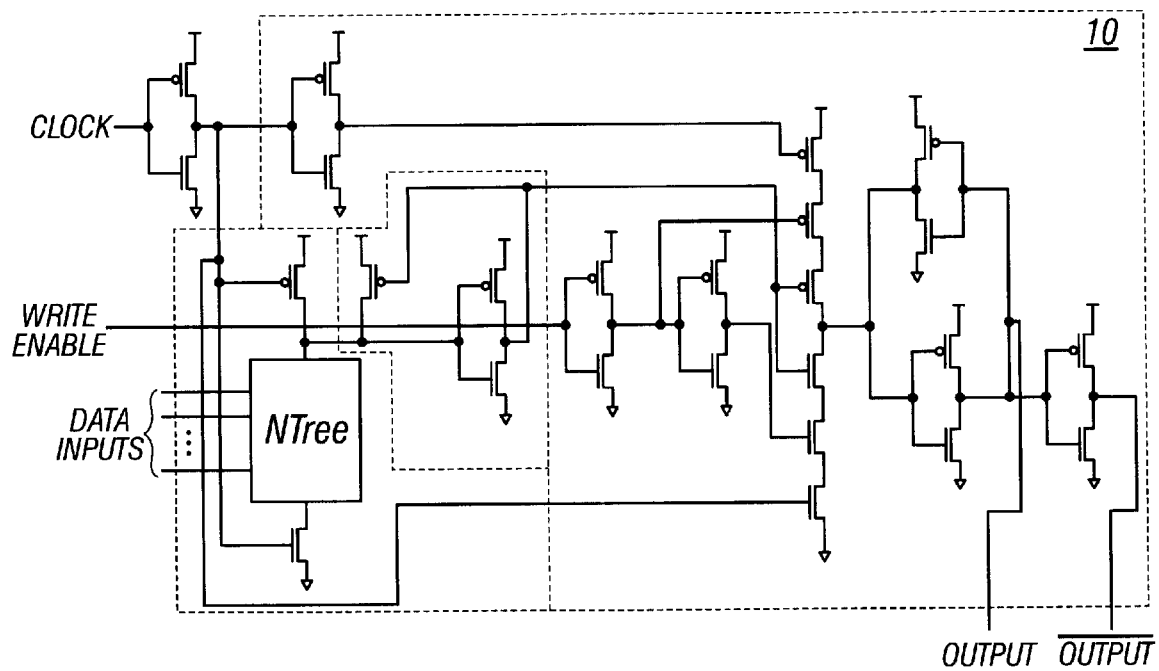
FIG. 2A shows an embodiment of a static storage element embedded in a NDL design.
Figure 2B:
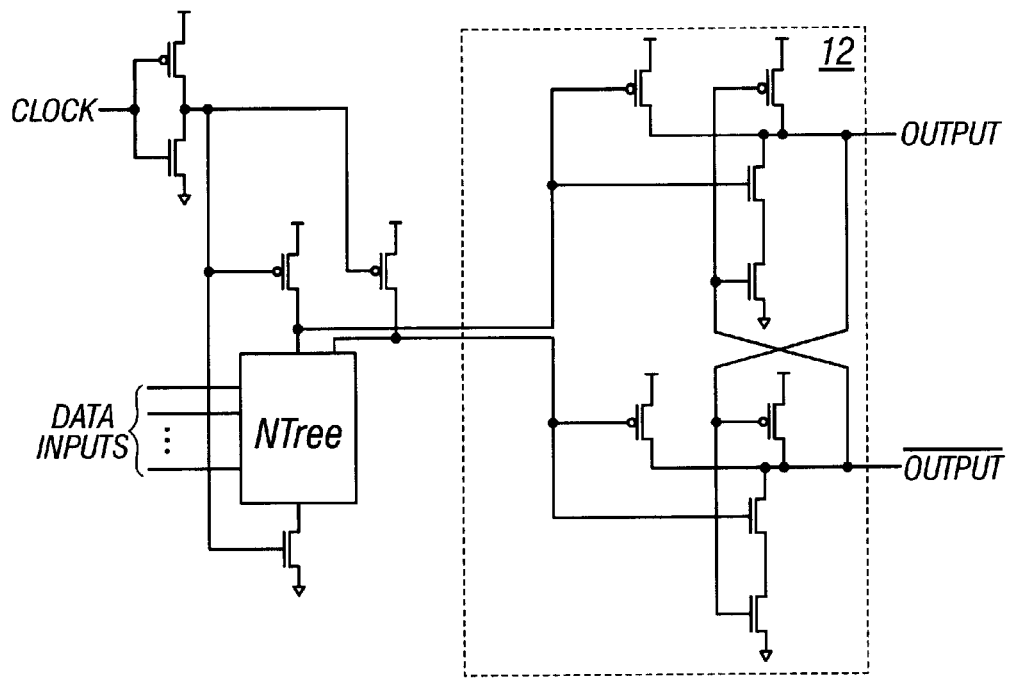
FIG. 2B shows an alternative embodiment of a static storage element in a NDL design.
Figure 2C:
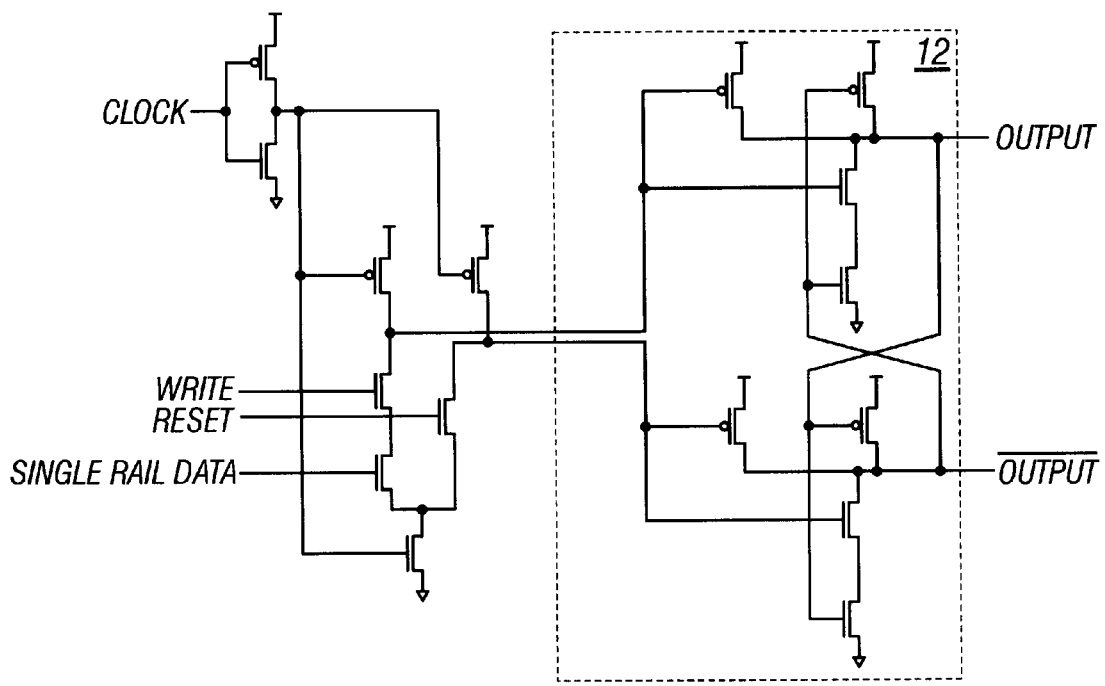
FIG. 2C shows the alternative embodiment of FIG. 2B embedded in a typical single rail dynamic logic design.

As described above, FAST14 designers may find it useful or desirable to reduce the power consumption of their FAST14 designs where possible. In typical dynamic designs, data is transmitted using a series of dynamic buffers as shown in FIG. 1, which refresh the dynamic data every clock cycle. As described above, constantly refreshing dynamic data every clock cycle can be viewed as a waste of power, particularly if the data is unchanging and/or not in the critical path of the design. The Static Storage Element Patent referenced above and incorporated into this disclosure describes two different embodiments of a static storage element that are suitable for use in NDL designs. These storage elements are shown embedded in FAST14 logic in FIGS. 2A (reference 10) and 2B (reference 12) herein, and embedded in single rail dynamic logic in FIG. 2C (reference 12). Using these storage elements to store data that remains unchanged over a relatively long period of time and to transmit that data saves power, because the static storage devices need not be precharged and discharged every clock cycle in order for the outputs to hold their values over multiple clock cycles. Users that are interested in the specifics of each embodiment of the static storage element are referred to the Static Storage Patent, which provides a complete description of the components and operation of the static devices 10 and 12 shown in FIGS. 2A, 2B, and 2C.

The Static Storage Element Patent also describes methods to specify the storage elements in the design and verify their functionality using the hardware development language and tools disclosed in U.S. Pat. Nos. 6,367,065 and 6,289,497, both of which are assigned to the assignee of the present invention, Intrinsity, Inc. (formerly, EVSX, Inc.), along with the commonly available transistor-level static timing analysis tool PATHMILL (available from Synopsis, Inc.) and the simulation tool VIS (Verification Interacting with Synthesis), fully documented and available for download at the VIS homepage (http://vlsi.colorado.edu/~vis/index.html). This disclosure describes how to use the static storage elements to transmit data in the NDL design statically. Those skilled in the art will understand that the multi-cycle path specification techniques and the resulting timing and verification tests generated from the multi-cycle path specification described in the Static Storage Element Patent and in this disclosure are not limited to the PATHMILL and VIS tools described in the exemplary embodiments, but can be adapted to any timing and behavioral verification tool used by the circuit developer.

Figure 3:
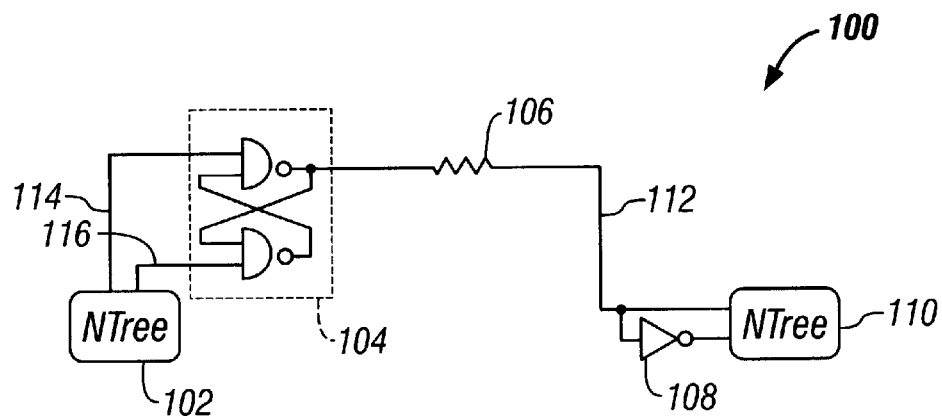
FIG. 3 shows an embodiment of the present invention, wherein data is statically transmitted to a NDL cell during a time period that comprises more than one clock cycle.

Practitioners of the present invention use the multi-cycle path specification techniques described in the Static Storage Element Patent to specify the transmission of data using multiple clock cycles, which allows the static signal time to switch. FIG. 3 shows an example of a circuit 100 utilizing the present invention to allow the static transmission of data within a FAST14 dynamic logic domain. In FIG. 3, evaluation nodes 114 and 116 of N-tree 102 are input to the static storage element 104, which provides a static data signal 112 having RC delay 106 to a downstream dynamic N-tree 110. FIG. 3 includes a simple static inverter 108 at the sink in order to generate complimentary data from the single static bit transmitted by signal 112. This inverter 108 could be replaced by a static encoder of any type at the cost of some latency, or left off altogether if single-rail data is sufficient. For example, designers could replace the inverter with a static 2-bit to 1-of-4 converter that accepts two inputs representing two bit values, and encodes them to create a 1-of-N FAST14 1-of-4 logic signal, if a 1-of-4 signal is required as an input to the next NDL gate in the datapath.

Figure 4:
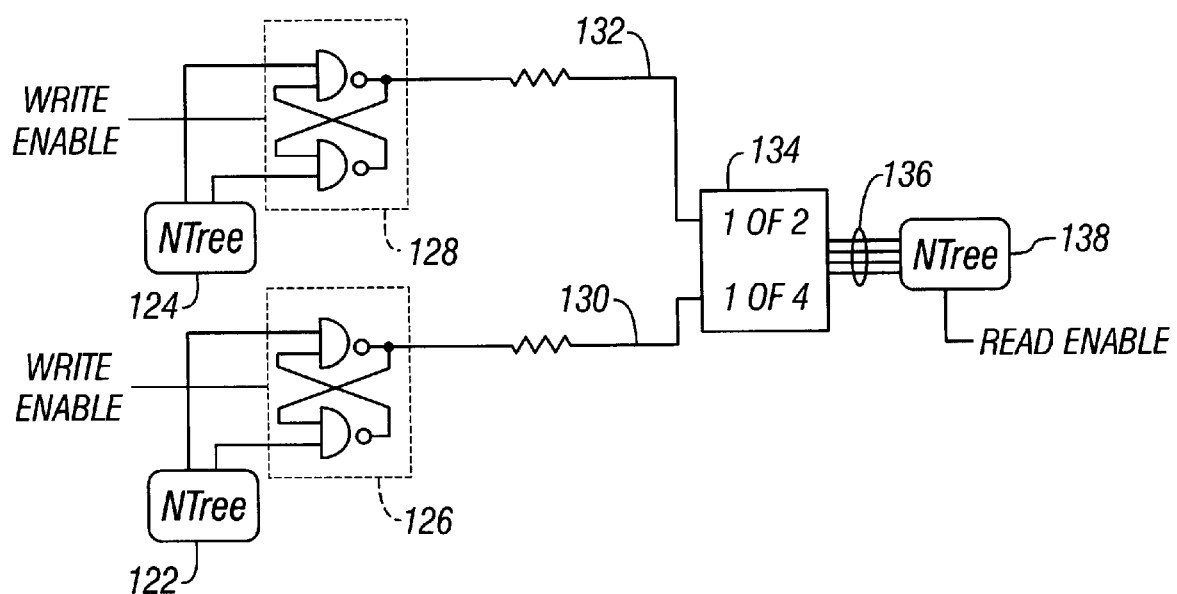
FIG. 4 shows an embodiment of the present invention that statically transmits bit values to a static converter that feeds a NDL read gate.

This configuration is shown in FIG. 4. FIG. 4 shows two N-trees 122 and 124, each of which outputs a 1-of-2 dynamic signal that represents the value of one bit. These dynamic signals are captured by static storage elements 126 and 128, and transmitted to a static converter 134 via static transmission paths 130 and 132. The converter 134 provides a 1-of-4 encoded input signal to the N-tree 138 of the NDL read gate 140. Suppose that the N-trees 122 and 124 evaluate when the phase 2 clock rises (i.e., they are each part of a phase 2 logic cell) and static storage elements 126 and 128 are both phase 2 fblats that each receive a phase 2 clock and a write enable signal as described in the Static Storage Element Patent. Suppose further that N-tree 130 is part of a phase 0 read gate. The gate instantiation would read as follows:

```
{
  net
    p5l_rs_B[1:0]_1h2;
    p5l_rs_B[1:0]_1h2 = p5l_rs_B[1:0]_1h1;
  inst fblat2 (
    "p6_rs_B[1:0]",
    "clk", phase2,
    "i", p5l_rs_B[1:0]_1h2,
    "o", p6_rs_B[1:0]_2S2,
    "ena", p6l_ps_wr_en_1h1
    );
}
// A static 1-of-2 to 1-of-4 converter
inst r2_to_r4 (
  "p6_rs_B1_0",
  "i", p6_rs_B[1:0]_2S2,
  "o", p6_rs_B1_0_4S2
  );
p5l_rs_B1_0_4h0=
  ((p5l_rs_B1_0_4h3    * (p6_rs_ps_sel_3h3 == PS_P5)) ||
   (p6l_rs_ps_fwd_B1_0_4h3 * (p6_rs_ps_sel_3h3 == PS_FWD)) ||
   (p6_rs_B1_0_4S2    * (p6_rs_ps_sel_3h3 == PS_P6)));
```

Those skilled in the art and familiar with the FAST14 hardware development language and tools disclosed in U.S. Pat. Nos. 6,367,065 and 6,289,497, will understand that this gate instantiation describes the fblat outputs as signal p6_rs_B0_2S2 and p6_rs_B1_2S2, each being a static signal generated by a phase 2 gate that is an input to the 1-of-2 to 1-of-4 converter. The static converter's output signal 136 is designated as p6_rs_B1_0_4S2 in this instantiation, which describes a 1-of-4 static signal named p6_rs_B1_0 that was generated using a phase 2 clock signal. The fblats count as being written whenever the write enable signal is true (p6l_ps_wr_en_1h1==1) and will be read whenever the read gate 138 is enabled. In this example, the read enable signal input to the read gate N-tree 138 is designated as p6_rs_ps_sel_3h3 (a 1-of-3 FAST14 signal internal to the gate that evaluates on a phase 3 clock). The read gate is enabled when the read enable signal holds value==PS_P6.

As further described in the Static Storage Element Patent, designers can specify a multi-cycle timing constraint for the static converter's output signal that feeds the NDL read gate using a generic pragma that compilers used by standard design and development tools will interpret to create the unique instruction statements that will verify the functionality or timing specified by the pragma. Those skilled in the art understand that a pragma is a standardized form of comment that has meaning to a compiler. Pragmas may use a special syntax or a specific form within the normal comment syntax. In their ordinary use, pragmas usually convey non-essential information that may be intended to help the compiler to optimize the program. However, as discussed in the Static Storage Element Patent, the pragmas that practitioners of the present invention create specify essential multi-cycle path timing constraints for the static signals that the development tools' compilers interpret to create timing and functional verification tests relating to the static signal. Continuing with the above example, the designer might specify the following multi-cycle path timing constraint for the converter output:

```
#pragma multi-cycle p5l_rs_B1_0_4h0 <read (p6_rs_ps_sel_3h3 == PS_P6 )>\
    <input p6_rs_B1_0_4S2>   \
    <forward 1>   \
    <backward 1>
```

This pragma is interpreted by the PATHMILL compiler to create a series of statements that check the setup and hold time of signal p6_rs_B1_0_4S2 relative to the specific clock edges of interest (i.e., those clock edges that trigger the read gate), and to skip checks around clock edges that need not be checked. The resulting PATHMILL assertions created by the PATHMILL compiler from this pragma are:

multi_cycle_path p6_rs_B1_0_4S2 p5l_rs_B1_0_4h0.bla mode=max dir=forward 2 multi_cycle_path p6_rs_B1_0_4S2 p5l_rs_B1_0_4h0.bla mode=min dir=backward 2

For functional verification, the pragma is interpreted by the compiler to create the following asserts, which verify that the bit0 and bit1 fblats are not being written and read at the same time:

```
// Generated with regard to the bit0 fblat
#pragma assert AG((p6l_ps_wr_en_1h1 == 1) -> !(p6_rs_ps_sel_3h3 == ps_P6)) \
    "failed setup timing assertion for gate p5l_rs_B0_1h2"
#pragma assert AG((p6_rs_ps_sel_3h3 == PS_P6 ) -> AX(!(p6l_PS_wr_en_1h1 == 1)))
\
```

-continued

```
    "failed hold timing assertion for gate p5l_rs_B0_1h2"
// Generated with regard to the bit1 fblat
    #pragma assert AG((p6l_ps_wr_en_1h1 == 1) -> !(p6_rs_ps_sel_3h3 == PS_P6)) \
        "failed setup timing assertion for gate p5l_rs_B1_1h2"
    #pragma assert AG((p6_rs_ps_sel_3h3 == PS_P6 ) -> AX(!(p6l_ps_wr_en_1h1 == 1)))
\
        "failed hold timing assertion for gate p5l_rs_B1_1h2"
```

These asserts can be used for functional simulation or by a formal verification tool such as VIS. Note that the tools recognized that for the hold-time assertion, there was a cycle boundary (hence the AX( )). Also note that the cone of logic was traced in order to generate asserts for all input signals.

Figure 5:
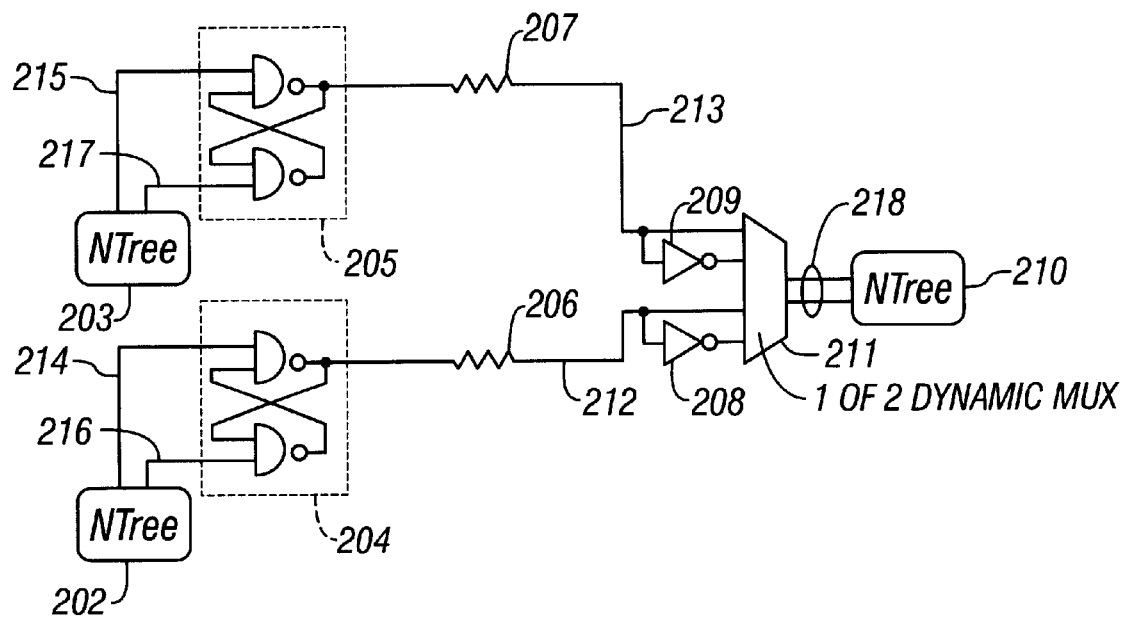
FIG. 5 shows an alternative embodiment of the present invention wherein data is statically transmitted to a NDL cell every cycle.

Returning to FIG. 3, those skilled in the art will recognize that the setup time requirement of the static data from the fblat 104 feeding NDL gate 110 dictates that the static wires may only be allowed to switch every other cycle (or less frequently, depending on the latency of the transmission). To transmit data every cycle, designers need to use multiple static input wires feeding the NDL gate, as shown in FIG. 5. FIG. 5 includes two NDL gates 202 and 203 that feed NDL gate 210 through static storage elements 204 and 205 and dynamic MUX 211. In FIG. 5, evaluation nodes 214 and 216 of N-tree 202 are inputs to static storage element 204, which provides a static data signal 212 having RC delay 206 to the dynamic MUX 211. Dynamic MUX 211 also receives the compliment of signal 212 from inverter 208. Likewise, evaluation nodes 215 and 217 of N-tree 203 are input to static storage element 205, which provides a static data signal 213 having RC delay 207 to the dynamic MUX 211. Dynamic MUX 211 also receives the compliment of signal 213 from inverter 209. Every cycle, dynamic MUX 211 selects either signal 212 and its compliment or signal 213 and its compliment, and provides the selected signal as a 1-of-2 signal 218 to N-tree 210.

The present invention also supports the ability to purposefully propagate unstable or invalid signals in those instances where designers might want to gate an unstable signal late in a dynamic cone of logic. As discussed previously, if a static signal at the input of an NDL gate transitions from high to low during the evaluate phase of that dynamic gate, when the high value had already started to switch the gate, then the output of the gate will be unknown or invalid (we say unstable) on that cycle. The preceding discussion describes how the present invention avoids this occurrence by insuring that the static input signal is stable and monotonic before the dynamic gate evaluates. However, those skilled in the art understand that occasionally it may be desirable to purposefully propagate unstable signals in a design. For example, in a circuit that compares a dynamic bus with a static bus (or two static buses, using a dynamic comparator) the cone of logic narrows from the width of the bus to a single hit/miss signal. If we gate the result in the last gate when the static signals are switching, then we need only gate it at a single point, rather than across the entire bus. This is simply a shifting by the number of unstable phases of the previously discussed assertions and can be done automatically by a tool, or manually with additional pragmas indicating the unstable gates. In either case the read expression pragma is applied to the gate that stops the propagation of the unstable signal. One skilled in the art will see that there are many other situations when allowing the gating to occur later in a dynamic cone of logic has advantages.

Practitioners of the present invention will find that they may achieve a significant power reduction by transmitting data statically rather than dynamically. Additionally, from a layout perspective, the present invention benefits designers that need to route data over relatively long distances, because simple static repeaters can be used in lieu of dynamic buffers that require a high-speed clock.

In sum, the present invention is a method and apparatus for the static transmission of FAST14 logic's 1-of-N signals. A static output signal is generated using a static storage element and transmitted to a NDL gate over a transmission path that is characterized by a user-specified multi-cycle timing constraint that is interpreted by the compiler of one or more development tools to create appropriate verification tests of the apparatus. The multi-cycle timing constraint may be a pragma that is interpreted by the compiler of a timing analysis tool such as PATHMILL to create statements that check the set-up and hold times of the static signal relative to the rising edge or falling edge of user-specified clock signal pulses. The same pragma is interpreted by the compiler of a functional verification tool such as VIS to create statements that test the behavior of the apparatus during the clock signal pulses other than the user-specified clock signal pulses tested by the timing analysis tool.

As a result of the setup and hold times associated with static signals that are inputs to dynamic gates, the static output signal may be required to hold its value for at least two successive clock cycles. To achieve higher data throughput, the present invention may include a dynamic mux that, during each clock cycle, selects either the static output signal or a second static output signal that also holds its value for at least two successive clock cycles. If the first and second static output signals are allowed to switch values on alternate clock pulses, the dynamic mux can provide new data to the NDL gate during each clock cycle.

Other embodiments of the invention will be apparent to those skilled in the art after considering this specification or practicing the disclosed invention. The specification and examples above are exemplary only, with the true scope of the invention being indicated by the following claims.

We claim the following invention:

1. An apparatus for the static transmission of FAST14 logic's 1-of-N signals, comprising:
   a storage element having a static output signal;
   an NDL gate that further comprises a 1-of-N dynamic logic circuit implemented in FAST14 logic technology, said NDL gate receives said static output signal; and
   a transmission path coupled to said storage element and to NDL gate that carries said static output signal, said transmission path is characterized by a multi-cycle path timing constraint that creates one or more tool-specific verification tests.

2. A system that includes an apparatus for the static transmission of FAST14 logic's 1-of-N signals, comprising:
   a storage element having a static output signal;
   an NDL gate that further comprises a 1-of-N dynamic logic circuit implemented in FAST14 logic technology, said NDL gate receives said static output signal; and a transmission path coupled to said storage element and to said NDL gate that carries said static output signal, said transmission path is characterized by a multi-cycle path timing constraint that creates one or more tool-specific verification tests.

3. A method to make an apparatus for the static transmission of FAST14 logic's 1-of-N signals, comprising:

providing a storage element having a static output signal;

providing an NDL gate that further comprises a 1-of-N dynamic logic circuit implemented in FAST14 logic technology, said NDL gate receives said static output signal; and coupling a transmission path to said storage element and to said NDL gate that carries said static output signal, said transmission path is characterized by a multi-cycle path timing constraint that creates one or more tool-specific verification tests.

4. A method to use an apparatus for the static transmission of FAST14 logic's 1-of-N signals, comprising:

generating a static output signal from a storage element;

receiving said static output signal at an NDL gate that further comprises a 1-of-N dynamic logic circuit implemented in FAST14 logic technology; and carrying said static output signal using a transmission path coupled to said storage element and to said NDL gate, said transmission path is characterized by a multi-cycle path timing constraint that creates one or more tool-specific verification tests.

5. A dependent claim according to claim 1, 2, 3, or 4, wherein said static output signal further comprises a first static output signal that holds its value for at least two successive clock cycles.

6. A dependent claim according to claim 5, wherein said transmission path is coupled to a dynamic mux that selects one of the following every clock cycle: either said first static output signal or a second static signal that holds its value for at least two successive clock cycles.

7. A dependent claim according to claim 1, 2, 3, or 4 wherein said multi-cycle path timing constraint further comprises a pragma that is interpreted by a PATHMILL compiler to create statements that check the set-up and hold times of said static signal relative to the rising edge or falling edge of user-specified clock signal pulses.

8. A dependent claim according to claim 7, wherein said pragma is interpreted by a compiler to create statements that test the behavior of the apparatus during the clock signal pulses other than said user-specified clock signal pulses.

9. An apparatus for the static transmission of FAST14 logic's 1-of-N signals, comprising:

a storage element having a first static output signal that holds its value for at least two successive clock cycles;

a dynamic mux that selects one of the following every clock cycle: either said first static output signal or a second static signal that holds its value for at least two successive clock cycles;

an NDL gate coupled to said dynamic mux that receives said first static output signal and said second static output signal, said NDL gate further comprises a 1-of-N dynamic logic circuit implemented in FAST14 logic technology; and a transmission path coupled to said storage element, to said dynamic mux, and to said NDL gate, said transmission path carries said first static output signal, said transmission path is characterized by a multi-cycle path timing constraint that further comprises a pragma that is interpreted by a PATHMILL compiler to create statements that check the set-up and hold times of said first static signal relative to the rising edge or falling edge of user-specified clock signal pulses, said pragma is interpreted by a compiler to create statements that test the behavior of the apparatus during the clock signal pulses other than said user-specified clock signal pulses.

10. A system that includes an apparatus for the static transmission of FAST14 logic's 1-of-N signals, comprising:

a storage element having a first static output signal that holds its value for at least two successive clock cycles;

a dynamic mux that selects one of the following every clock cycle: either said first static output signal or a second static signal that holds its value for at least two successive clock cycles;

an NDL gate coupled to said dynamic mux that receives said first static output signal and said second static output signal, said NDL gate further comprises a 1-of-N dynamic logic circuit implemented in FAST14 logic technology; and a transmission path coupled to said storage element, to said dynamic mux, and to said NDL gate, said transmission path carries said first static output signal, said transmission path is characterized by a multi-cycle path timing constraint that further comprises a pragma that is interpreted by a PATHMILL compiler to create statements that check the set-up and hold times of said first static signal relative to the rising edge or falling edge of user-specified clock signal pulses, said pragma is interpreted by a compiler to create statements that test the behavior of the apparatus during the clock signal pulses other than said user-specified clock signal pulses.

11. A method to make an apparatus for the static transmission of FAST14 logic's 1-of-N signals, comprising:

providing a storage element having a first static output signal that holds its value for at least two successive clock cycles;

providing a dynamic mux that selects one of the following every clock cycle: either said first static output signal or a second static signal that holds its value for at least two successive clock cycles;

coupling an NDL gate to said dynamic mux that receives said first static output signal and said second static output signal, said NDL gate further comprises a 1-of-N dynamic logic circuit implemented in FAST14 logic technology; and coupling a transmission path to said storage element, to said dynamic mux, and to said NDL gate, said transmission path carries said first static output signal, said transmission path is characterized by a multi-cycle path timing constraint that further comprises a pragma that is interpreted by a PATHMILL compiler to create statements that check the set-up and hold times of said first static signal relative to the rising edge or falling edge of user-specified clock signal pulses, said pragma is interpreted by a compiler to create statements that test the behavior of the apparatus during the clock signal pulses other than said user-specified clock signal pulses.

12. A method to use an apparatus for the static transmission of FAST14 logic's 1-of-N signals, comprising:

generating a first static output signal that holds its value for at least two successive clock cycles from a storage element;

using a dynamic mux to select one of the following every clock cycle: either said first static output signal or a second static signal that holds its value for at least two successive clock cycles;

receiving said first static output signal and said second static output signal at an NDL gate that further comprises a 1-of-N dynamic logic circuit implemented in FAST14 logic technology; and carrying said first static output signal using a transmission path coupled to said storage element, to said dynamic mux, and to said NDL gate, said transmission path is characterized by a multi-cycle path timing constraint that further comprises a pragma that is interpreted by a PATHMILL compiler to create statements that check the set-up and hold times of said first static signal relative to the rising edge or falling edge of user-specified clock signal pulses, said pragma is interpreted by a compiler to create statements that test the behavior of the apparatus during the clock signal pulses other than said user-specified clock signal pulses.

* * * * *